United States Patent [19]
Chia et al.

[11] 3,852,328
[45] Dec. 3, 1974

[54] CATALYTIC ISOMERIZATION OF 2-METHYL-3-BUTENENITRILE TO A LINEAR PENTENENITRILE

[75] Inventors: Yuan-Tsan Chia, Wilmington, Del.; William C. Seidel, Orange, Tex.

[73] Assignee: E. I. du Pont de Nemours and Company, Wilmington, Del.

[22] Filed: Sept. 26, 1973

[21] Appl. No.: 401,073

[52] U.S. Cl. ............................................. 260/465.9
[51] Int. Cl. ......................................... C07c 121/30
[58] Field of Search ................................. 260/465.9

[56] References Cited
UNITED STATES PATENTS 3,536,748   10/1970   Drinkard, Jr. et al. .......... 260/465.9
3,676,481   7/1972    Chia ................................ 260/465.9
3,686,264   8/1972    Albanese et al. ................ 260/465.3
3,697,578   10/1972   Pasquino et al. ................ 260/465.9

Primary Examiner—Joseph P. Brust

[57] ABSTRACT

A process for isomerizing 2-methyl-3-butenenitrile to a linear pentenenitrile such as 3-pentenenitrile with a $\pi$-allyl nickel catalyst compound. The linear pentenenitriles can be further hydrocyanated to produce adiponitrile, an intermediate to hexamethylenediamine used in manufacture of polyamides for fibers, films and molded articles.

8 Claims, No Drawings

CATALYTIC ISOMERIZATION OF 2-METHYL-3-BUTENENITRILE TO A LINEAR PENTENENITRILE

BACKGROUND OF THE INVENTION

This invention is concerned with the isomerization of 2-methyl-3-butenenitrile to a linear pentenenitrile and more particularly to 3-pentenenitrile. In the hydrocyanation of butadiene to produce 3-pentenenitrile, an intermediate which on further hydrocyanation yields adiponitrile, a considerable amount of 2-methyl-3-butenenitrile is obtained as a by-product. Processes for isomerizing 2-methyl-3-butenenitrile to linear pentenitriles such as 3-pentenenitrile are described in U.S. Pat. Nos. 3,536,748 and 3,676,481. In order to realize an overall economic process for production of adiponitrile, a highly efficient process for converting by-product 2-methyl-3-butenenitrile to 3-pentenenitrile has been sought.

SUMMARY OF THE INVENTION

It has now been found that 2-methyl-3-butenenitrile can be isomerized in high conversion to 3-pentenenitrile by carrying out the isomerization in the presence of a $\pi$-allyl nickel catalyst compound. The $\pi$-allyl nickel compound consists essentially of a compound of the formula

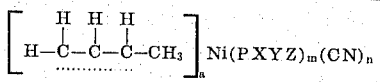

wherein PXYZ is a sigma-pi bonding ligand in which X is OR, Y and Z are R or OR and R is an alkyl or aryl radical having up to 18 carbon atoms, wherein the R radicals of a given ligand are so chosen that the ligand has a cone angle of 130° to 170°, $a$ has a value of 1, $m$ has a value of 1–2 and $n$ has a value of 1.

The reaction can be carried out by introducing into the reactor containing 2-methyl-3-butenenitrile (2M3BN) a zerovalent nickel complex of the type $Ni(PXYZ)_3$ whereupon an N-bonded nitrile complex $Ni(PXYZ)_3(2M3BN)$ is immediately produced. The latter complex is rapidly transformed into the $\pi$-allyl nickel complex which is the active catalyst species for the isomerization reaction. Alternately a preformed N-bonded nitrile complex $Ni(PXYZ)_3(NCR')$ wherein R'CN is 2-methyl-3-butenenitrile or 3-pentenenitrile (3PN) can be introduced into the reactor, which in turn is transformed to the $\pi$-allyl nickel complex. Another alternative is to feed $Ni(PXYZ)_3(NCR')$ wherein R'CN is an organic nitrile such as acetonitrile, adiponitrile, methylglutaronitrile or benzonitrile into the reactor containing 2M3BN or 3PN. The N-bonded nitrile complex $Ni(PXYZ)_3(2M3BN)$ or $Ni(PXYZ)_3(3PN)$ is produced and transformed to the $\pi$-allyl complexes indicated above.

The N-bonded nitrile complexes can be prepared as described by C. A. Tolman, *Inorganic Chemistry* 10 No. 7 (1971) page 1,540 or they can be made in situ by contacting nickel chloride with an organic nitrile such as 3PN or 2M3BN, a triaryl phosphorus compound such as tri-o-tolyl phosphite, a promoter such as ammonia or an ammonium halide and a finely divided reducing metal such as zinc. The zinc halide present in the reduction mixture containing the nickel complex can be removed by precipitation with gaseous ammonia. In the course of the isomerization reaction some of the 3-pentenenitrile produced may be further isomerized to 4-pentenenitrile.

The isomerization reaction can be carried out at a temperature in the range of 0° to 120°C., preferably 80°–110°C. at subatmospheric, atmospheric or superatmospheric pressures and as a batch or continuous process. The mole ratio of 2-methyl-3-butenenitrile to catalyst can be in the range of 1:2 to 2,000:1.

It may be of advantage to employ an excess of PXYZ ligand over that required in the $\pi$-allyl nickel compound. The excess ligand may be added to the catalyst compound already formed in the reactor or it can be added preceding catalyst formation. In general, at least a one-mole excess of the ligand can be used and amounts of 30 moles excess or more may be used, the top limit being dictated mainly by economics.

Phosphorus ligands of the type PXYZ having a cone angle in the range of 130° to 170° include tri-o-tolyl phosphite (141°), tri-(2,5-xylyl)phosphite (144°) and di-o-tolyl phenyl phosphonite (142°). Other suitable phosphorus ligands include tri-(2,4-xylyl)phosphite, tri-(o-phenylphenyl) phosphite, diphenylphenyl phosphonite and phenyl diphenyl phosphinite. The cone angle is determined as described by C. A. Tolman, *J. Am. Chem. Soc.* 92, 2,956(1970).

As will be evident in the Examples, a particular advantage of the process of this invention is the high conversion of 2-methyl-3-butenenitrile to 3-pentenenitrile that is realized and that this higher conversion is effected without the use of a promoter.

The 3-pentenenitrile obtainable by the process of this invention is useful as an intermediate to adiponitrile which in turn is a well known intermediate used in the production of commercial polyamides for fibers, films and molded articles. A particular advantage of the process of this invention is the higher conversion to 3-pentenenitrile that is realized.

DESCRIPTION OF PREFERRED EMBODIMENTS

The preferred embodiments of this invention are illustrated in the examples to follow. Analysis of reaction products was carried out by gas chromatography. Gas chromatography data expressed in area percent are approximations of weight percent. See Purnell, *Gas Chromatography*, John Wiley and Sons (1962), page 285.

EXAMPLE 1

To a 100 ml., nitrogen-flushed, dry, round-bottom flask was added 10 ml. tri-o-tolyl phosphite (o-TTP), 20 ml. 2-methyl-3butenenitrile (2M3BN) and 1.11 g. tris-tri-o-tolyl phosphite nickel ($NiL_3$), prepared as described by L. W. Gosser and C. A. Tolman, *Inorganic Chemistry* 9, 2,350 (1970). The flask and contents were heated under a nitrogen atmosphere at 120°C. for 1 hour at atmospheric pressure. Analysis of the nitriles showed 3.02 percent conversion to 2-methyl-2-butenenitrile (2M2BN) and 6.57 percent conversion to linear 3- and 4-pentenenitriles (3,4PN).

EXAMPLE 2

The procedure was the same as in Example 1 except that to the flask were added 15 ml. o-TTP, 30 ml. 2M3BN, and 1.11 gm. $NiL_3$. The reaction proceeded at 82°C. for 16 hours, after which analysis showed 32.5 percent conversion to 3,4PN, 1.40 percent conversion to 2M2BN's, and 0.29 percent conversion to methylglutaronitrile (MGN).

Example 3

The procedure was the same as in Example 1, except that to the flask were added 20 ml. 2M3BN, 5 ml. o-TTP, and 2.22 gm. NiL$_3$. The reaction was allowed to proceed at 95°C. for 7 hours, after which analysis showed 94.1 percent conversion to 3,4PN and 1.90 percent conversion to 2M2BN.

EXAMPLE 4

The same procedure as in Example 1 was used except that to the flask were added 10 ml. 2M3BN, 20 ml. o-TTP, and 1.11 gm. NiL$_3$. The reaction was allowed to proceed at 95°C. for 7 hours, at which time analysis showed 89.4 percent conversion to 3,4PN, 0.51 percent conversion to 2M2BN, and 0.31 percent conversion to MGN. Analysis of nickel catalyst remaining in the flask showed 1,350 moles 2M3BN reacted per mole of nickel catalyst consumed.

EXAMPLE 5

The same procedure as in Example 1 was used except that to the flask were added 2.22 gm. NiL$_3$, 20 ml. o-TTP, and 10 ml. 2M3BN. The reaction was allowed to proceed for 7 hours at 95°C., at which time analysis showed 95.1 percent conversion to 3,4PN, 0.45 percent conversion to 2M2BN, and 0.29 percent conversion to MGN.

EXAMPLE 6

The same procedure as in Example 4 was used except that the reaction was allowed to proceed for 4 hours at 105°C. Analysis of the reaction products showed 94.6 percent conversion to 3,4PN, 0.96 percent conversion to 2M2BN's, and 0.16 percent conversion to MGN. Nickel analyses established that catalyst was being consumed at a rate of one mole of nickel catalyst for every 631 moles 2M3BN reacting.

EXAMPLE 7

The procedure was the same as in Example 6, except that to the flask were added 1.11 gm. NiL$_3$, 10 ml. o-TTP, and 20 ml. 2M3BN. After the reaction had progressed for 4 hours at 105°C. analysis showed 83.2 percent conversion to 3,4PN, and 1.87 percent conversion to 2M2BN.

We claim:

1. A process of isomerizing 2-methyl-3-butenenitrile and thereby producing 3-pentenenitrile which comprises contacting the 2-methyl-3-butenenitrile at a temperature of 0° to 120°C. with a catalyst consisting essentially of a π-allyl nickel complex of the formula

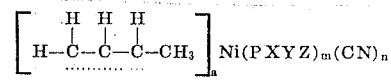

wherein PXYZ is a sigma-pi bonding ligand in which X is OR, Y and Z are R or OR and R is an aryl radical or an alkyl hydrocarbyl radical having up to 18 carbon atoms, wherein the R radicals of a given ligand are so chosen that the ligand has a cone angle in the range of 130° to 170°, $a$ has a value of 1, $m$ has a value of 1–2 and $n$ has a value of 1, the mole ratio of 2-methyl-3-butenenitrile to catalyst being in the range of 1:2 to 2,000:1.

2. The process of claim 1 wherein the isomerization is carried out at a temperature in the range of 80°–110°C.

3. The process of claim 2 wherein at least a one-mole excess of the ligand PXYZ is used over that required for the π-allyl nickel complex.

4. The process of claim 3 wherein PXYZ is tri-o-tolyl phosphite.

5. A process of isomerizing 2-methyl-3-butenenitrile and thereby producing 3-pentenenitrile which comprises introducing into a reactor maintained at a temperature in the range of 0° to 120°C., and into which 2-methyl-3-butenenitrile is also being introduced, an N-bonded nitrile complex of the formula Ni(PXYZ)$_3$(NCR') wherein PXYZ is a sigma-pi bonding ligand in which X is OR, Y and Z are R or OR and R is an aryl radical or an alkyl hydrocarbyl radical having up to 18 carbon atoms, wherein the R radicals of a given ligand are so chosen that the ligand has a cone angle of 130° to 170°, wherein R'CN is an organonitrile of the group consisting of 3-pentenenitrile, 2-methyl-3-butenenitrile, adiponitrile, methylglutaronitrile, acetonitrile or benzonitrile, the mole ratio of 2-methyl-3-butenenitrile to N-bonded nitrile complex being in the range of 1:2 to 2,000:1.

6. The process of claim 5 wherein the temperature is maintained in the range of 80° to 110°C.

7. The process of claim 6 wherein at least a one-mole excess of the ligand PXYZ is used over that required in the N-bonded nitrile complex.

8. The process of claim 7 wherein PXYZ is tri-o-tolyl phosphite.

* * * * *